(12) United States Patent
Ishii et al.

(10) Patent No.: US 10,741,131 B2
(45) Date of Patent: Aug. 11, 2020

(54) DISPLAY APPARATUS AND DISPLAY METHOD

(71) Applicant: CANON KABUSHIKI KAISHA, Tokyo (JP)

(72) Inventors: Shinya Ishii, Tokyo (JP); Joji Kamahara, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 43 days.

(21) Appl. No.: 15/982,154

(22) Filed: May 17, 2018

(65) Prior Publication Data
US 2018/0336849 A1 Nov. 22, 2018

(30) Foreign Application Priority Data

May 19, 2017 (JP) .................................. 2017-099671
Feb. 22, 2018 (JP) .................................. 2018-029449

(51) Int. Cl.
*H04N 9/68* (2006.01)
*G09G 3/34* (2006.01)
(Continued)

(52) U.S. Cl.
CPC ..... *G09G 3/3413* (2013.01); *G02F 1/133611* (2013.01); *G06F 3/0412* (2013.01);
(Continued)

(58) Field of Classification Search
CPC ......... G06F 3/017; G06T 5/008; G09G 5/003; G09G 3/3611; G09F 13/06
(Continued)

(56) References Cited

U.S. PATENT DOCUMENTS

2007/0132695 A1* 6/2007 Kim ..................... G09G 3/3611
345/98
2010/0177215 A1* 7/2010 Kita ....................... G06T 5/008
348/234
(Continued)

FOREIGN PATENT DOCUMENTS

JP 2007-228048 A 9/2007
JP 2007-259303 A 10/2007
(Continued)

OTHER PUBLICATIONS

The above foreign patent documents were cited in the Apr. 2, 2019 Japanese Office Action, which is enclosed without an English Translation, that issued in Japanese Patent Application No. 2018-029449.

*Primary Examiner* — Abdul-Samad A Adediran
(74) *Attorney, Agent, or Firm* — Cowan, Liebowitz & Latman, P.C.

(57) ABSTRACT

A display apparatus according to the present invention, includes: a display unit configured to display an image based on display image data generated from input image data; a control unit configured to control emission brightness of a light source of the display unit; and a detecting unit configured to detect a user operation for specifying a position in the image, wherein the control unit controls the emission brightness of the light source of the display unit in accordance with a gradation value of the input image data corresponding to the position specified by the user operation, to emission brightness that is lower than set emission brightness or to emission brightness that is higher than the set emission brightness.

15 Claims, 11 Drawing Sheets

(51) Int. Cl.
*G06F 3/041* (2006.01)
*G02F 1/13357* (2006.01)
*G09G 3/36* (2006.01)
*G06T 5/00* (2006.01)
*G06F 3/0488* (2013.01)

(52) U.S. Cl.
CPC ............... *G06T 5/008* (2013.01); *G09G 3/36* (2013.01); *G06F 3/0488* (2013.01); *G09G 2320/0276* (2013.01); *G09G 2320/0626* (2013.01); *G09G 2320/0686* (2013.01); *G09G 2340/06* (2013.01)

(58) Field of Classification Search
USPC .................... 315/152; 345/98, 590; 348/234; 715/863
See application file for complete search history.

(56) References Cited

U.S. PATENT DOCUMENTS

| | | | |
|---|---|---|---|
| 2011/0055774 A1* | 3/2011 | Kim | G06F 3/017 715/863 |
| 2014/0009071 A1* | 1/2014 | Schindler | G09F 13/06 315/152 |
| 2015/0243228 A1* | 8/2015 | Kimura | G09G 3/3611 345/590 |
| 2017/0061894 A1* | 3/2017 | Ikeda | G09G 5/003 |

FOREIGN PATENT DOCUMENTS

| | | |
|---|---|---|
| JP | 2008-058443 A | 3/2008 |
| JP | 2014-155005 A | 8/2014 |
| JP | 2015-029225 A | 2/2015 |
| WO | 2007/046320 A1 | 4/2007 |

\* cited by examiner

DISPLAY APPARATUS AND DISPLAY METHOD

BACKGROUND OF THE INVENTION

Field of the Invention

The present invention relates to a display apparatus and a display method.

Description of the Related Art

In recent years, more imaging apparatuses capable of generating captured image data with a wide dynamic range have become available. A wide dynamic range is referred to as a "high dynamic range (HDR)" and the like and image data with an HDR is referred to as "HDR image data" and the like. In addition, opportunities where HDR image data are assumed have increased in settings such as image creation, development of apparatuses (including image processing apparatuses and display apparatuses), and the like.

Realizing a display image that is faithful to HDR image data requires a high-precision display apparatus. For example, a display apparatus is required which has a high upper limit of display brightness, which is capable of realizing a display image with high contrast, and which is capable of realizing a display image with a wide dynamic range. A display apparatus capable of realizing a display image that is faithful to HDR image data will be hereinafter referred to as an "HDR display apparatus". For example, a display apparatus satisfying conditions that an upper limit of display brightness is equal to or higher than 1000 nits (=1000 cd/m$^2$) and that a lower limit of display brightness is equal to or lower than 0.03 nits is defined as an HDR display apparatus. A liquid crystal display apparatus satisfying conditions that an upper limit of display brightness is equal to or higher than 1000 nits and that a lower limit of display brightness is equal to or lower than 0.05 nits may be defined as an HDR display apparatus. A self-luminous display apparatus (such as an organic EL display apparatus) satisfying conditions that an upper limit of display brightness is equal to or higher than 540 nits and that a lower limit of display brightness is equal to or lower than 0.0005 nits may be defined as an HDR display apparatus.

However, there is no guarantee that an HDR display apparatus is usable in various settings. For example, at a photographing location, a non-HDR display apparatus is used due to constraints on power supplies, carryable items, and the like. A non-HDR display apparatus is a standard dynamic range (SDR) display apparatus that is not an HDR display apparatus, an HDR display apparatus with limited display capabilities, and the like. For example, a non-HDR display apparatus is a display apparatus with a narrow dynamic range of display brightness and with a low upper limit of display brightness.

A non-HDR display apparatus is incapable of realizing a display image that is faithful to HDR image data. With a non-HDR display apparatus, display in which a dynamic range of HDR image data is compressed is performed as display of HDR image data. In other words, with a non-HDR display apparatus, display in which at least a part of gradation properties (gradation properties in a high brightness range, gradation properties in a low brightness range, or the like) of HDR image data is reduced is performed as display of HDR image data.

Examples of techniques related to changing gradation properties of a display image are disclosed in Japanese Patent Application Laid-open No. 2007-228048 and Japanese Patent Application Laid-open No. 2008-58443. With the technique disclosed in Japanese Patent Application Laid-open No. 2007-228048, a brightness distribution diagram representing a brightness distribution of displayed image data is displayed and a user can readily change gradation properties of the image data using the brightness distribution diagram. With the technique disclosed in Japanese Patent Application Laid-open No. 2008-58443, average brightness of image data is detected, emission brightness of a backlight unit is reduced when the average brightness is low, and the emission brightness of the backlight unit is increased when the average brightness is high.

SUMMARY OF THE INVENTION

However, with conventional art, when focusing on a part of a gradation range of image data, the part cannot always be made visible with preferable display brightness.

The present invention in its first aspect provides a display apparatus, comprising:

a display unit configured to display an image based on display image data generated from input image data;

a control unit configured to control emission brightness of a light source of the display unit; and a detecting unit configured to detect a user operation for specifying a position in the image, wherein the control unit controls the emission brightness of the light source of the display unit in accordance with a gradation value of the input image data corresponding to the position specified by the user operation, to emission brightness that is lower than set emission brightness or to emission brightness that is higher than the set emission brightness.

The present invention in its second aspect provides a display method, comprising:

a display step of displaying an image on a display unit based on display image data generated from input image data:

a control step of controlling emission brightness of a light source of the display unit; and a detecting step of detecting a user operation for specifying a position in the image, wherein in the control step, the emission brightness of the light source of the display unit is controlled in accordance with a gradation value of the input image data corresponding to the position specified by the user operation, to emission brightness that is lower than set emission brightness or to emission brightness that is higher than the set emission brightness.

The present invention in its third aspect provides a non-transitory computer readable medium that stores a program, wherein the program causes a computer to execute the above mentioned display method.

Further features of the present invention will become apparent from the following description of exemplary embodiments with reference to the attached drawings.

DESCRIPTION OF THE EMBODIMENTS

First Embodiment

A first embodiment of the present invention will be described below. A display apparatus according to the present embodiment is an apparatus capable of displaying an image and is not particularly limited. For example, the display apparatus is a transmissive display apparatus including a light emitting unit and a display panel which displays images by transmitting light emitted from the light emitting unit. The transmissive display apparatus is a liquid crystal display apparatus, a micro electro mechanical system (MEMS) shutter system display apparatus, and the like. The display apparatus may be a self-luminous display apparatus such as an organic electro-luminescence (EL) display apparatus or a plasma display apparatus. The display apparatus may also be a projection apparatus (a projector), a personal computer, a PDA, a tablet terminal, a mobile phone terminal (including a smartphone), a television apparatus, an imaging apparatus (a digital camera), a digital photo frame, a game device, an electric home appliance, a car-mounted apparatus, and the like.

Figure 1:
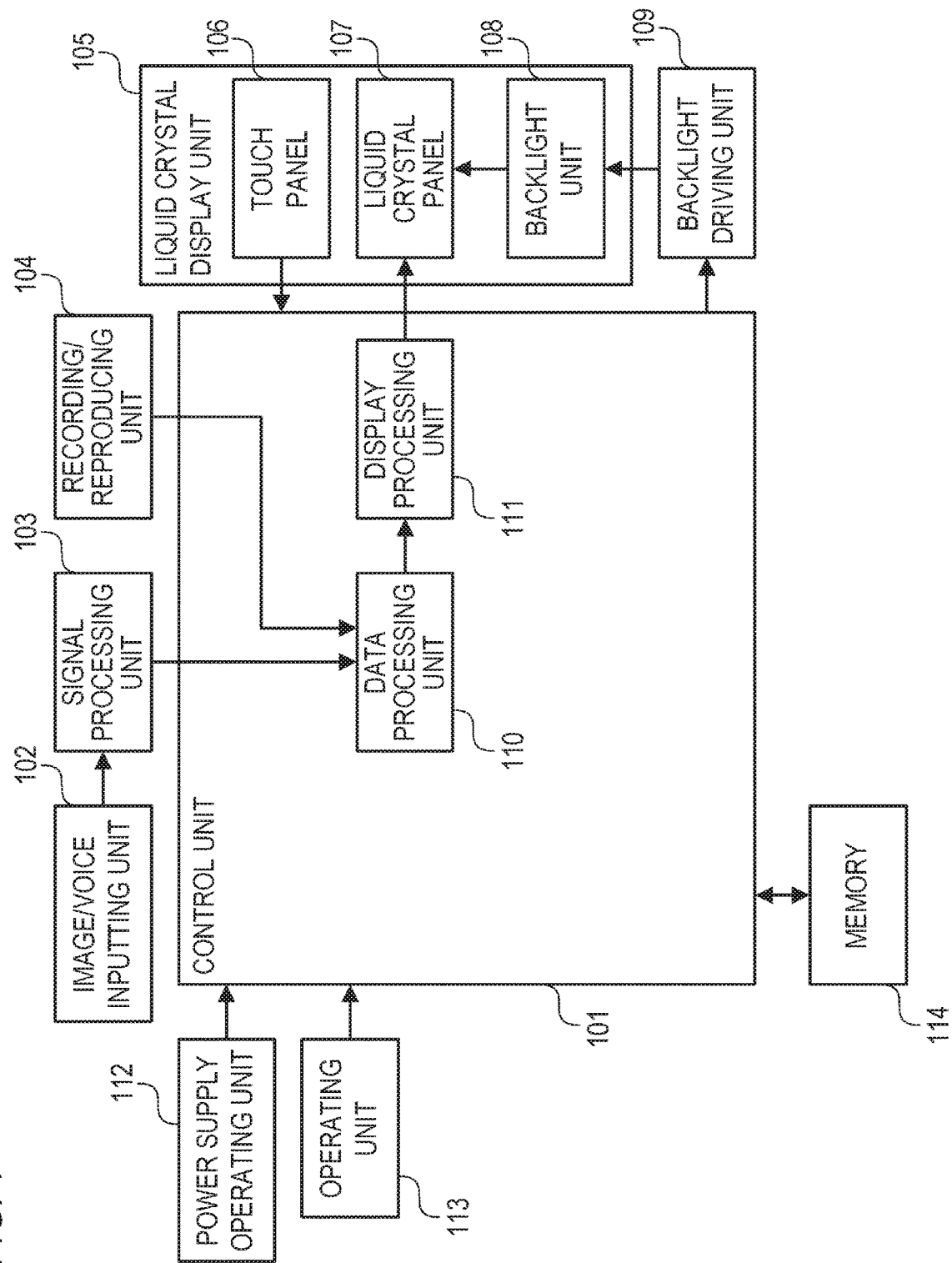
FIG. 1 is a block diagram showing a configuration example of an imaging apparatus according to a first embodiment.

A configuration example of an imaging apparatus (a digital video camera) that is a liquid crystal display apparatus according to the present embodiment will now be described using FIG. 1. FIG. 1 is a block diagram showing a configuration example of the imaging apparatus according to the present embodiment.

A control unit 101 performs various processes of the imaging apparatus. A signal processing unit 103, a recording/reproducing unit 104, a liquid crystal display unit 105, a backlight driving unit 109, a power supply operating unit 112, an operating unit 113, and a memory 114 are connected to the control unit 101. The control unit 101 includes a data processing unit 110 and a display processing unit 111, and the liquid crystal display unit 105 includes a touch panel 106, a liquid crystal panel 107, and a backlight unit 108.

An image/voice inputting unit 102 acquires an image signal that is an analog signal representing an image and a voice signal that is an analog signal representing voice, and outputs the image signal and the voice signal to the signal processing unit 103. The image/voice inputting unit 102 includes an imaging unit (an imaging sensor; an image capturing element) and a voice inputting unit (a microphone). Light from a subject enters the imaging unit via a lens. Accordingly, an optical image representing the subject is formed (imaged) on the imaging unit. The imaging unit converts the formed optical image into an image signal having a predetermined signal format and outputs the image signal. The voice inputting unit converts input voice into a voice signal and outputs the voice signal.

The signal processing unit 103 performs predetermined signal processing on the analog signals output from the image/voice inputting unit 102. The predetermined signal processing includes one or both signal processing with respect to an image signal and signal processing with respect to a voice signal. For example, the predetermined signal processing includes a noise reduction process for reducing a noise component, an automatic gain control (AGC) process for keeping a signal level constant, and the like. The signal processing unit 103 includes an A/D conversion unit which converts the analog signal after the predetermined signal processing into a digital signal (digital data). The signal processing unit 103 outputs digital data obtained by the A/D conversion unit (image data that is digital data representing an image and voice data that is digital data representing voice) to the control unit 101.

The recording/reproducing unit 104 performs a recording process, a reproduction process, and the like. The recording process is a process in which digital data (image data and voice data) output from the control unit 101 to the recording/reproducing unit 104 is recorded in a storage unit. The reproduction process is a process in which digital data (image data and voice data) is read from the storage unit and the read digital data is output to the control unit 101. The recording process and the reproduction process are switched and executed in accordance with an instruction from the control unit 101.

The touch panel 106 is an operating unit capable of accepting various user operations (operations performed by a user) with respect to the imaging apparatus. For example, the touch panel 106 is capable of accepting a mode setting operation for instructing setting of a display mode, a mode canceling operation for instructing cancellation of the setting of a display mode, a recording operation for instructing execution of the recording process, a reproduction operation for instructing execution of the reproduction process, and the like. Specifically, the touch panel 106 detects contact by the user with respect to the touch panel 106 and outputs a detection result of the contact (a contact position, a contact time, a change in the contact position, and the like) to the control unit 101. Based on the detection result of the contact, the control unit 101 determines the performed user operation. When the mode setting operation is performed, the control unit 101 sets a display mode corresponding to the mode setting operation. The control unit 101 is capable of setting one or more display modes among a plurality of display modes. When the mode canceling operation is performed, the control unit 101 cancels the setting of the display mode corresponding to the mode canceling operation. Although an arrangement of the touch panel 106 is not particularly limited, in the present embodiment, the touch panel 106 is provided on a display surface (screen) of the liquid crystal panel 107.

Due to the liquid crystal panel 107 and the backlight unit 108, an image based on processed image data is displayed on the screen. The backlight unit 108 irradiates light on a rear surface of the liquid crystal panel 107. By transmitting, based on the processed image data, light emitted from the backlight unit 108, the liquid crystal panel 107 displays an image based on the processed image data. Specifically, when display image data is output from the control unit 101 to the liquid crystal panel 107, a liquid crystal drive signal (current, voltage, and the like) in accordance with a gradation value of the display image data is supplied to each of a plurality of liquid crystal elements included in the liquid crystal panel 107. As a result, transmittance (a transmittance distribution) of the liquid crystal panel 107 is controlled to transmittance in accordance with the display image data. Therefore, by transmitting, in accordance with the display image data, light emitted from the backlight unit 108, the liquid crystal panel 107 displays an image based on the display image data. The display image data is the processed image data or image data obtained by performing data processing (image processing) on the processed image data. Therefore, transmittance in accordance with the display image data is also transmittance in accordance with the processed image data, and an image based on the display image data is also an image based on the processed image data.

The backlight driving unit 109 supplies the backlight unit 108 with a backlight drive signal (current, voltage, and the like). For example, the backlight driving unit 109 is a power supply circuit which supplies the backlight unit 108 with a current. The backlight unit 108 emits light at emission brightness (an emission amount) in accordance with the supplied backlight drive signal. The control unit 101 is capable of controlling the emission brightness of the backlight unit 108. Specifically, the control unit 101 is capable of controlling the backlight drive signal output from the backlight driving unit 109. By controlling the backlight drive signal, the emission brightness of the backlight unit 108 is controlled. In addition, by controlling the emission brightness of the backlight unit 108, display brightness (brightness of the screen) is controlled.

The data processing unit 110 acquires input image data and input voice data. For example, in a period in which the reproduction process is being performed, the data processing unit 110 acquires image data output from the recording/reproducing unit 104 as input image data and acquires voice data output from the recording/reproducing unit 104 as input voice data. In a period in which the reproduction process is not being performed, the data processing unit 110 acquires image data output from the signal processing unit 103 as input image data and acquires voice data output from the signal processing unit 103 as input voice data. In the present embodiment, when a reproduction operation is performed, the control unit 101 instructs the recording/reproducing unit 104 to execute the reproduction process. As a result, the reproduction process is performed by the recording/reproducing unit 104.

The data processing unit 110 performs predetermined data processing on acquired digital data. The predetermined data processing includes one or both data processing with respect to input image data and data processing with respect to input voice data. For example, the predetermined data processing includes a format conversion process for converting a data format of digital data, a resizing process for converting an image size of input image data, and a compositing process for compositing graphic image data with input image data. Graphic image data is, for example, on-screen display (OSD) image data which represents a menu image or the like. The data processing unit 110 outputs image data after the predetermined data processing to the display processing unit 111 and outputs voice data after the predetermined data processing to a speaker. The speaker emits voice in accordance with the voice data output to the speaker.

In addition, the data processing unit 110 is capable of outputting, to the recording/reproducing unit 104, digital data (image data and voice data) output from the signal processing unit 103. In the present embodiment, when a recording operation is performed, the control unit 101 instructs the recording/reproducing unit 104 to execute the recording process. In addition, the data processing unit 110 outputs, to the recording/reproducing unit 104, digital data output from the signal processing unit 103. As a result, the recording process is performed by the recording/reproducing unit 104.

In the present embodiment, captured image data (image data representing a subject) is used as input image data. However, input image data is not limited to captured image data. For example, input image data may be computer graphic image data, illustration image data, and the like. In addition, input image data may be still image data or moving image data.

The display processing unit 111 performs data processing based on the set display mode with respect to image data output from the data processing unit 110. As a result, display image data is generated. In addition, the display processing unit 111 outputs the display image data to the liquid crystal panel 107. In this manner, in the present embodiment, input image data is converted into display image data by the control unit 101 (the data processing unit 110 and the display processing unit 111).

The power supply operating unit 112 is an operating unit (a switch or the like) which is capable of accepting a start-up operation for instructing start-up of the imaging apparatus and a stoppage operation for instructing stoppage of the imaging apparatus. The start-up operation can also be described as "an operation for instructing switching from an off state to an on state (switching of a power supply state of the imaging apparatus)" and the stoppage operation can also be described as "an operation for instructing switching of the power supply state from the on state to the off state". When the user performs the start-up operation with respect to the imaging apparatus, the control unit 101 performs a start-up process for starting up the imaging apparatus. When the user performs the stoppage operation with respect to the imaging apparatus, the control unit 101 performs a stoppage process for stopping the imaging apparatus.

The operating unit 113 is an operating unit (a switch or the like) which is capable of accepting various user operations with respect to the imaging apparatus. For example, the operating unit 113 is capable of accepting the mode setting operation, the mode canceling operation, the recording operation, the reproduction operation, and the like. Operations acceptable by the operating unit 113 may or may not be the same as the user operations acceptable by the touch panel 106.

The memory 114 temporarily stores data and the like to be used in processing by the control unit 101.

Figure 2:
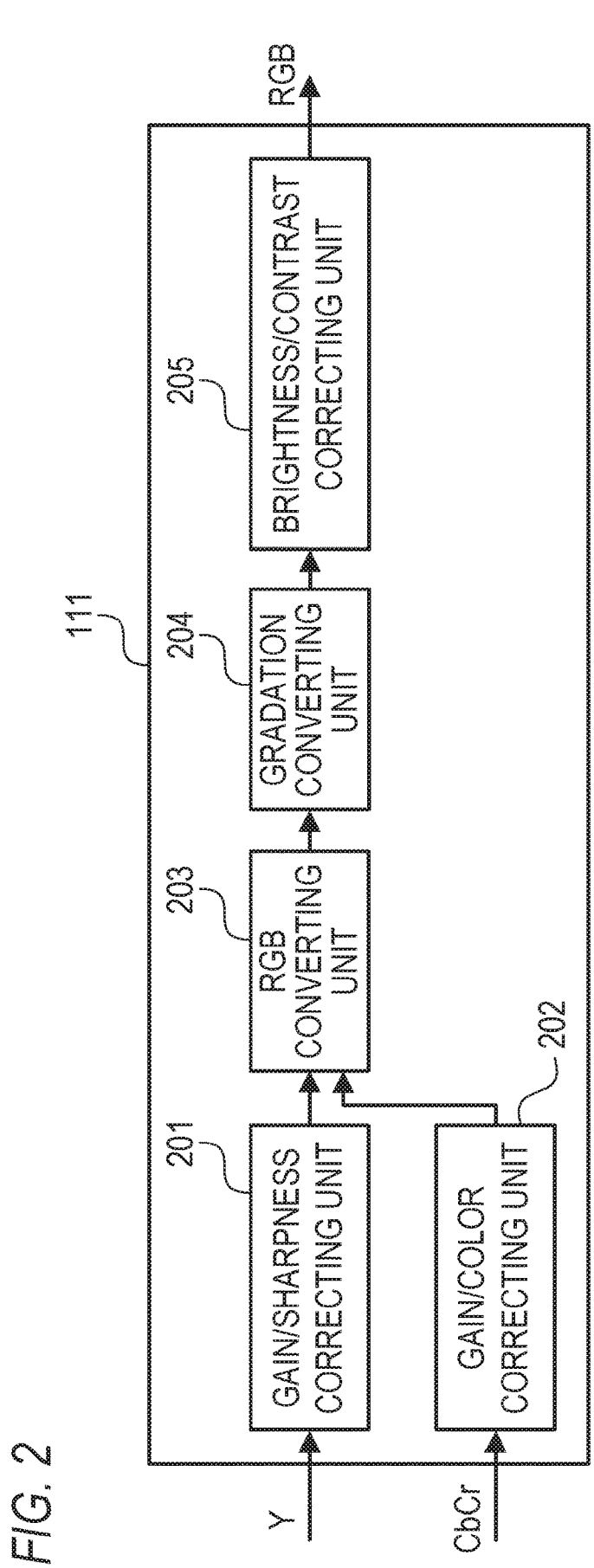
FIG. 2 is a block diagram showing a configuration example of a display processing unit according to the first embodiment.

A configuration example of the display processing unit 111 will be described with reference to FIG. 2. FIG. 2 is a block diagram showing a configuration example of the display processing unit 111. In the present embodiment, YCbCr data is output from the data processing unit 110 to the display processing unit 111. YCrCb data refers to image data in which each pixel value is a YCbCr value (a combination of a Y value, a Cr value, and a Cb value).

A gain/sharpness correcting unit 201 generates processed brightness data by performing predetermined data processing on brightness data (a Y value of each pixel) included in YCbCr data. For example, the predetermined data processing includes a gain adjustment process for adjusting a gradation value (Y value) and a sharpness correction process for enhancing an edge. In addition, the gain/sharpness correcting unit 201 outputs the processed brightness data to an RGB converting unit 203.

A gain/color correcting unit 202 generates processed color difference data by performing predetermined data processing on color difference data (a Cb value and a Cr value of each pixel) included in YCbCr data. For example, the predetermined data processing includes a gain adjustment process for adjusting a gradation value (at least one of a Cb value and a Cr value) and a color correction process for adjusting color (chroma, hue, or the like). In addition, the gain/color correcting unit 202 outputs the processed color difference data to the RGB converting unit 203.

The RGB converting unit 203 converts a combination of the processed brightness data and the processed color difference data (YCbCr data in which each pixel value is a combination of a Y value of the processed brightness data, a Cb value of the processed color difference data, and a Cr value of the processed color difference data) into RGB data. RGB data refers to image data in which each pixel value is an RGB value (a combination of an R value, a G value, and a B value). For example, the RGB converting unit 203 converts YCbCr data into RGB data by a one-dimensional matrix computing process. In addition, the RGB converting unit 203 outputs the RGB data to a gradation converting unit 204.

The gradation converting unit 204 generates processed image data by performing a gradation conversion process on the RGB data output from the RGB converting unit 203. The gradation conversion process refers to data processing for converting a correspondence relationship between a gradation value and display brightness of image data that is a processing object and is, for example, a gamma correction process. A method of performing the gradation conversion process is not particularly limited. For example, in the gamma conversion process, a gradation value of image data is converted using information (a lookup table, a function, or the like) indicating a correspondence relationship between a gradation value prior to conversion and a gradation value after the conversion. The gradation converting unit 204 performs the gradation conversion process on each of an R value, a G value, and a B value. As a result, RGB data is generated as processed image data. The gradation converting unit 204 outputs the processed image data to a brightness/contrast correcting unit 205.

The brightness/contrast correcting unit 205 generates display image data by performing a brightness correction process, a contrast correction process, and the like on the processed image data output from the gradation converting unit 204. The brightness correction process refers to data processing for correcting brightness of image data, and the contrast correction process refers to data processing for correcting a contrast of image data. By controlling the brightness correction process, display brightness is controlled, and by controlling the contrast correction process, display contrast (a contrast of a screen) is controlled. The brightness/contrast correcting unit 205 performs the brightness correction process, the contrast correction process, and the like on each of an R value, a G value, and a B value. As a result, RGB data is generated as display image data. The brightness/contrast correcting unit 205 outputs the display image data to the liquid crystal panel 107. In order to generate display image data from processed image data, other data processing may be performed on the processed image data.

For the sake of brevity, in the present embodiment, input image data is also assumed to be RGB data. It is assumed that a gradation value of input image data, a gradation value of processed image data, a gradation value of display image data, and the like are 8-bit values (256-color values). It is assumed that, with respect to an increase in the gradation value of processed image data, the gradation value of the display image data, and the like, display brightness, transmittance of liquid crystal elements, a value (a current value, a voltage value, or the like) of a liquid crystal drive signal, and the like increase linearly. In addition, it is assumed that display image data is equivalent to processed image data. Moreover, the number of bits in a gradation value of each piece of image data, a data format of each piece of image data, and the like are not particularly limited. Correspondence relationships of the gradation value of processed image data, the gradation value of the display image data, the display brightness, the transmittance of liquid crystal elements, the value of a liquid crystal drive signal, and the like are also not particularly limited. For example, with respect to an increase in the gradation value of processed image data, the gradation value of the display image data, and the like, the display brightness, the transmittance of liquid crystal elements, the value (a current value, a voltage value, or the like) of a liquid crystal drive signal, and the like may increase nonlinearly.

An example of a method of setting a dynamic range assist mode will be described. The dynamic range assist mode is a display mode in which display (assist display) is performed by improving gradation properties of a range of interest that is a part of a gradation range (a range of gradation values; a dynamic range) of input image data.

First, a start-up operation using the power supply operating unit 112 is performed and power is supplied to the respective functional units of the imaging apparatus. Next, a mode setting operation for instructing setting of a camera recording mode is performed using the operating unit 113, and the control unit 101 sets the camera recording mode.

Figure 3A:
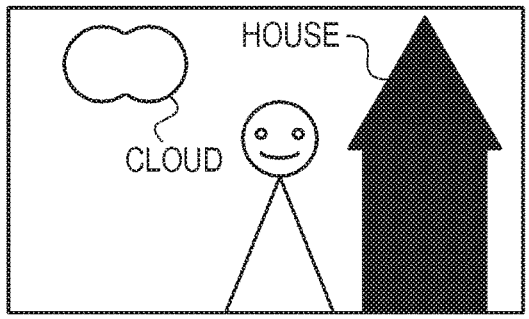
FIGS. 3A to 3E are diagrams showing examples of images according to the first embodiment.

At this point, a gradation conversion process in which an input level is converted into an output level according to predetermined conversion characteristics (a correspondence relationship between the input level and the output level) is performed and an image shown in FIG. 3A is displayed on the screen (the liquid crystal panel 107). The input level refers to a gradation value prior to conversion and corresponds to the gradation value of the input image data. The output level refers to a gradation value after the conversion and corresponds to the gradation value of the processed image data, the gradation value of the display image data, and the like. The image shown in FIG. 3A is an image based on the input image data (captured image data) output from the signal processing unit 103 and is a captured image representing a present state of the subject.

Figure 4A:
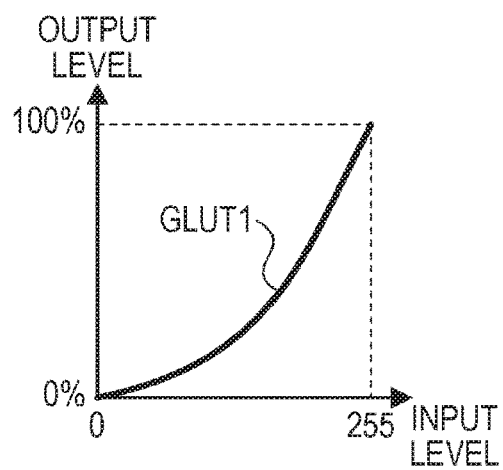
FIGS. 4A to 4E are diagrams showing examples of conversion characteristics according to the first embodiment.

While the predetermined conversion characteristics are not particularly limited, in the present embodiment, the predetermined conversion characteristics are standard conversion characteristics corresponding to a gamma value of 2.2 and are conversion characteristics GLUT1 shown in FIG. 4A. A horizontal axis in FIG. 4A represents an input level and a vertical axis in FIG. 4A represents an output level. The image shown in FIG. 3A is an image after a gradation conversion process using the conversion characteristics GLUT1 shown in FIG. 4A. The output level can also be described as "display brightness". The conversion characteristics GLUT1 may be reverse characteristics of gradation characteristics of the input image data (captured image data).

Subsequently, a mode setting operation for instructing setting of the dynamic range assist mode is performed using the touch panel 106, and the control unit 101 sets the dynamic range assist mode. For example, a menu image is displayed in response to a user operation with respect to the operating unit 113, the touch panel 106, or the like, and a user operation involving touching a predetermined location of the displayed menu screen is performed as the mode setting operation for instructing setting of the dynamic range assist mode. Accordingly, the image displayed on the screen makes a transition from the image shown in FIG. 3A to an image shown in FIGS. 3B and 3D. In the image shown in FIGS. 3B and 3D, a message reading "touch gradation portion that you wish to enlarge" is described on the image shown in FIG. 3A. The menu image, the message, and the like are displayed by data processing performed by the data processing unit 110.

In the present embodiment, a user operation involving touching the screen is performed as a user operation for selecting (specifying) a position in an image displayed on the screen. In addition, the control unit 101 sets a range of interest in accordance with the user operation involving touching the screen. Due to the message described above being displayed, a user operation for setting a range of interest is prompted. Moreover, a display prompting a user operation for setting a range of interest is not limited to displaying the message described above. For example, a predetermined icon may be displayed as a display prompting a user operation for setting a range of interest.

An example of a method of setting a range of interest will be described. As described above, in the present embodiment, a user operation involving touching the screen is performed as a user operation for selecting a position in an image displayed on the screen. The touch panel 106 detects a user operation involving touching the screen, and the control unit 101 detects a position (a touch position) selected by the user operation and detects an input level M corresponding to the detected position. The input level M corresponding to the touch position refers to an input level of a pixel displayed at the touch position. In addition, the control unit 101 determines and sets a gradation range with a predetermined width centered on the input level M as a range of interest (a gradation range of interest). While a width of the range of interest is not particularly limited, in the present embodiment, the width of the range of interest is assumed to be 60.

Moreover, the input level M corresponding to the touch position may be an average value of gradation values in the gradation range with the predetermined width centered on an input level of the pixel displayed at the touch position. Alternatively, the input level M corresponding to the touch position may be an average value of pixel values of an area with a predetermined size including the pixel displayed at the touch position.

Figure 3B:
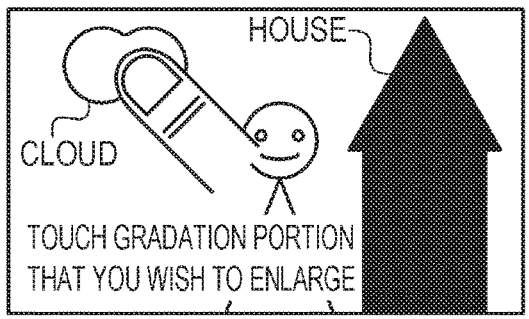
Figure 3D:
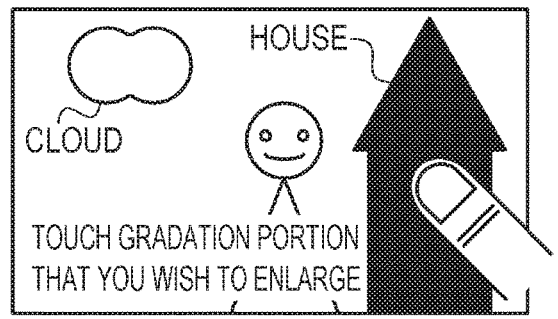
Figure 4B:
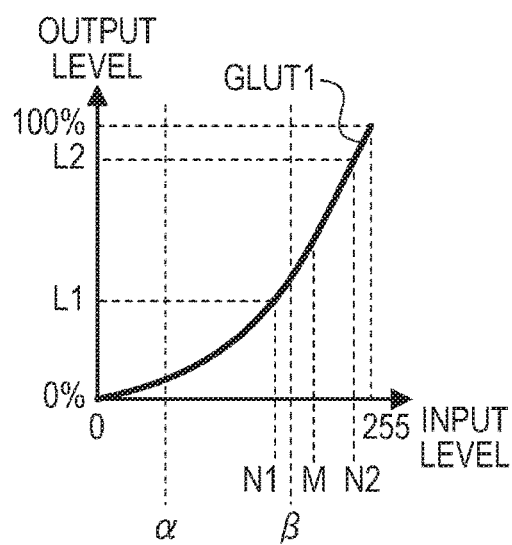
Figure 4D:
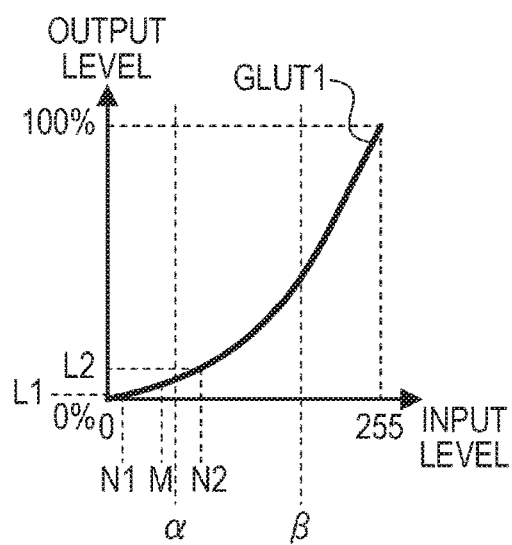

In FIG. 3B, a bright cloud is being touched. In this case, as shown in FIG. 4B, a high gradation-side input level is detected as the input level M and a high gradation-side gradation range is detected as the range of interest. In FIG. 3D, a dark house is being touched. In this case, as shown in FIG. 4D, a low gradation-side input level is detected as the input level M and a low gradation-side gradation range is detected as the range of interest. In FIGS. 4B and 4D, an input level N1 represents a minimum value of the input level in the range of interest and an input level N2 represents a maximum value of the input level in the range of interest. The input level N1 is obtained by subtracting 30 from the input level M and the input level N2 is obtained by adding 30 to the input level M.

Moreover, a method of setting a range of interest is not particularly limited. For example, an input level in accordance with a user operation for setting a range of interest may correspond to a position other than a center of the range of interest. Specifically, a range of interest of which an input level in accordance with a user operation is a minimum value may be set or a range of interest of which an input level in accordance with a user operation is a maximum value may be set. A width of a range of interest need not be a fixed value. A user operation for setting a range of interest is not limited to a user operation involving touching the screen. For example, a user operation for selecting a position of an image displayed on the screen using up, down, left, and right buttons (not shown) or the like may be performed in order to set the range of interest. A user operation for setting a range of interest need not be a user operation for selecting a position of an image displayed on the screen. For example, a user operation for specifying (inputting) an input level may be performed, and a gradation range including the input level specified by the user operation may be set as the range of interest. A user operation for specifying both a minimum value and a maximum value of an input level in a range of interest may be performed. In other words, a user operation for specifying a range of interest may be performed.

An example of a method of improving gradation properties of a range of interest will be described. The control unit 101 sets (changes) conversion characteristics of the gradation conversion process based on a range of interest. Accordingly, input image data is converted into display image data (processed image data) of which gradation properties with respect to the range of interest are higher than predetermined gradation properties. The predetermined gradation properties refer to gradation properties of display image data when using the predetermined conversion characteristics (GLUT1 shown in FIG. 4A). In the present embodiment, the control unit 101 sets conversion characteristics so that a ratio of a range corresponding to the range of interest (a gradation range corresponding to the range of interest) of display image data to an entire gradation range of the display image data equals a predetermined value. While the predetermined value is not particularly limited, in the present embodiment, the predetermined value is assumed to be 70%.

Figure 4C:
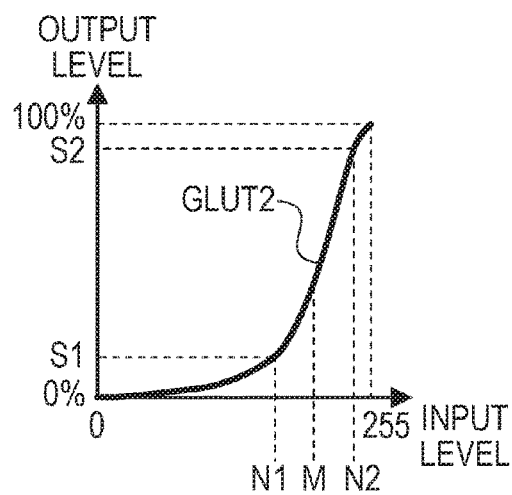
Figure 4E:
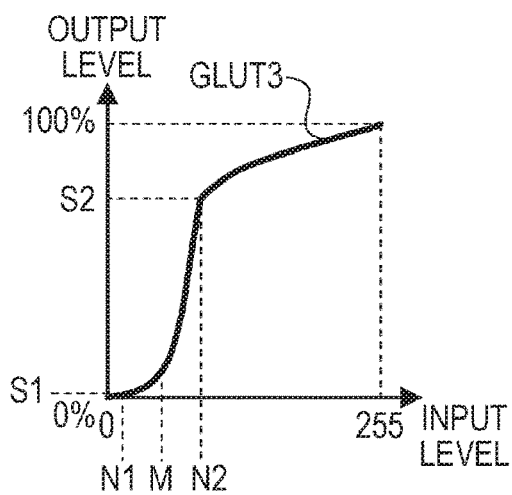

When a range of interest shown in FIG. 4B is set, conversion characteristics GLUT2 shown in FIG. 4C are set. When a range of interest shown in FIG. 4D is set, conversion characteristics GLUT3 shown in FIG. 4E are set. In FIGS. 4A to 4E, a lower limit value of the output level is 0% and an upper limit value of the output level is 100%. As shown in FIGS. 4B and 4D, in the conversion characteristics GLUT1, an output level L1 is associated with the input level N1 and an output level L2 is associated with the input level N2. On the other hand, as shown in FIGS. 4C and 4E, in the conversion characteristics GLUT2 and GLUT3, an output level S is associated with the input level N1 and an output level S2 is associated with the input level N2. A value obtained by subtracting the output level S from the output level S2 is 70%.

As shown in FIGS. 4B to 4E, a corresponding range of interest (a gradation range from the output level S1 to the output level S2) of the conversion characteristics GLUT2 and GLUT3 is wider than a corresponding range of interest (a gradation range from the output level L1 to the output level L2) of the conversion characteristics GLUT. Therefore, by using the conversion characteristics GLUT2 and GLUT3, display image data is obtained in which gradation properties with respect to the range of interest are higher than the predetermined gradation properties (gradation properties when using the conversion characteristics GLUT1).

In addition, as shown in FIGS. 4B to 4E, a remaining range of interest (a gradation range other than the corresponding range of interest) of the conversion characteristics GLUT2 and GLUT3 is narrower than a remaining range of interest of the conversion characteristics GLUT1. Therefore, by using the conversion characteristics GLUT2 and GLUT3, display image data is obtained in which gradation properties with respect to a gradation range other than the range of interest are lower than the predetermined gradation properties.

By switching conversion characteristics of the gradation conversion process from the conversion characteristics GLUT1 to the conversion characteristics GLUT2 and GLUT3, an image displayed on the screen is switched. Here, a case where an image is displayed at set display brightness will be considered. In this case, by switching conversion characteristics of the gradation conversion process from the conversion characteristics GLUT1 to the conversion characteristics GLUT2, the user perceives the image shown in FIG. 3C as the image displayed on the screen. In the image shown in FIG. 3C, gradation properties of the cloud are higher than the gradation properties of FIG. 3A. In addition, by perceiving the image shown in FIG. 3C, the user can recognize the existence of two clouds. The existence of two clouds cannot be recognized from the image shown in FIG. 3A. In addition, by switching conversion characteristics of the gradation conversion process from the conversion characteristics GLUT1 to the conversion characteristics GLUT3, the user perceives the image shown in FIG. 3E as the image displayed on the screen. In the image shown in FIG. 3E, gradation properties of the house are higher than the gradation properties of FIG. 3A. In addition, by perceiving the image shown in FIG. 3E, the user can recognize the existence of windows. The existence of the windows cannot be recognized from the image shown in FIG. 3A.

Moreover, a method of setting display brightness is not particularly limited. For example, the display brightness is set so that a predetermined pixel value (a pixel value of white or the like) of display image data is displayed in desired display brightness. The set display brightness may be display brightness (fixed brightness) set in advance or display brightness that can be changed in accordance with a user operation or the like. In the present embodiment, it is assumed that the display brightness is set in advance so that white is displayed at 400 cd/m$^2$.

Moreover, a method of improving gradation properties of a range of interest is not particularly limited. For example, a ratio of a range corresponding to the range of interest of display image data to the entire gradation range of the display image data may change depending on the range of interest. As a user operation for setting the range of interest, a user operation for specifying conversion characteristics may be performed.

An example of a method of canceling the dynamic range assist mode will be described. An assist cancellation button is arranged in the images shown in FIGS. 3C and 3E. When a user operation involving touching the assist cancellation button is performed, the control unit 101 cancels dynamic range assist and restores conversion characteristics to the conversion characteristics GLUT1. Accordingly, the image displayed on the screen is returned to the image shown in FIG. 3A.

Figure 3C:
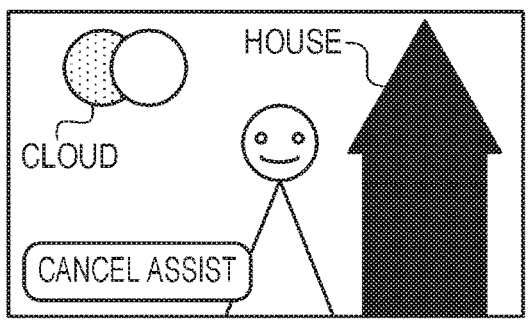
Figure 3E:
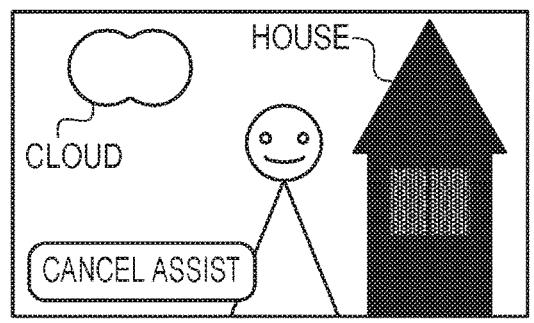

In human visual characteristics, visibility with respect to high-gradation side gradation properties declines as display brightness increases. Therefore, when set display brightness is maintained, the user is only able to perceive two clouds as shown in FIG. 3C despite the existence of three clouds in the image displayed on the screen. In addition, in human visual characteristics, visibility with respect to low-gradation side gradation properties declines as display brightness decreases. Therefore, when set display brightness is maintained, the user is unable to perceive a boundary between a roof of a house and a wall of the house as shown in FIG. 3E. In this manner, by maintaining set display brightness, when displaying a part of a gradation range of input image data with high gradation properties, the part cannot be visualized with sufficiently high gradation properties.

Figure 5:
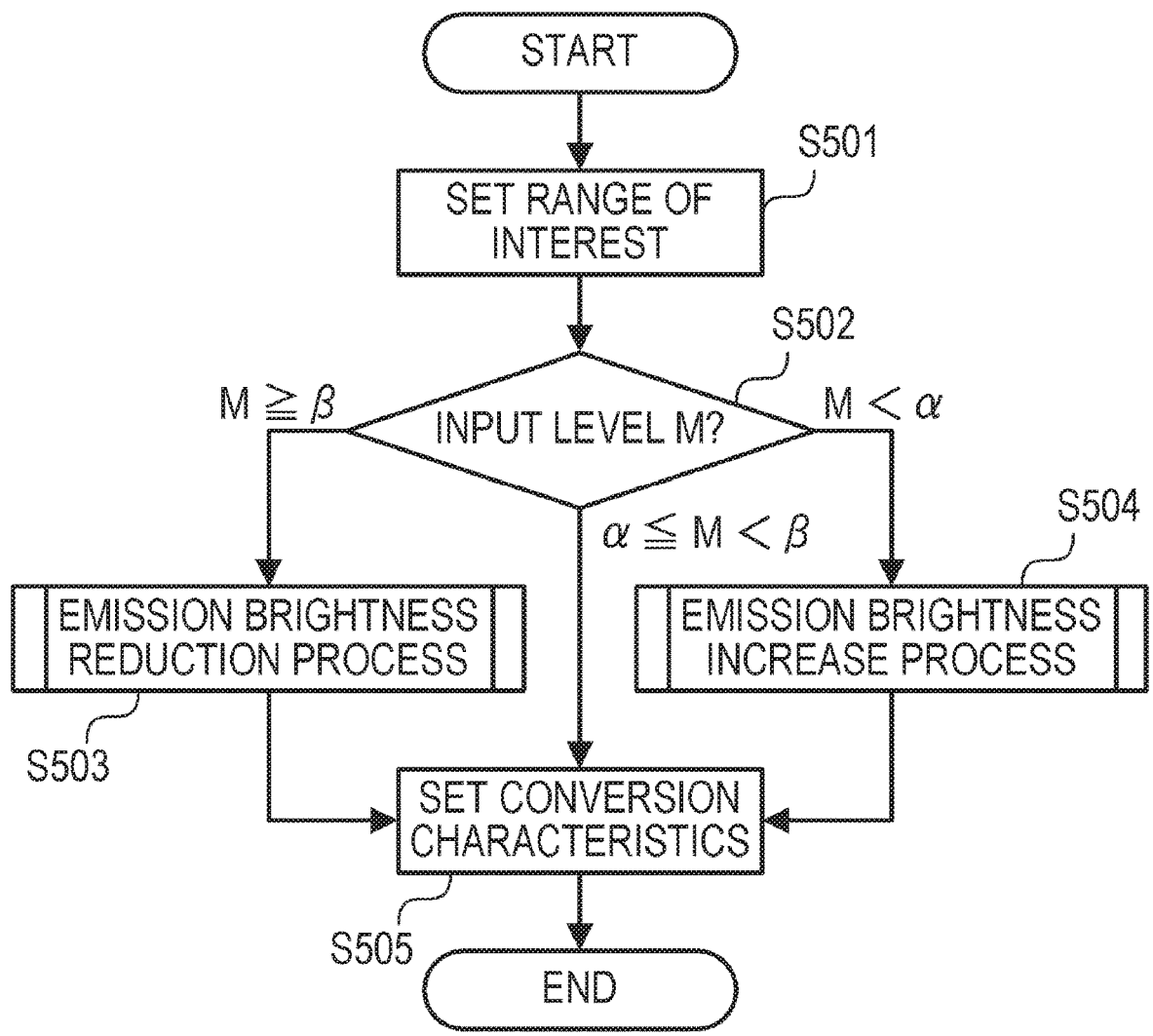
FIG. 5 is a flow chart showing an example of a processing flow according to the first embodiment.

In consideration thereof, the control unit 101 controls the display brightness of the image displayed on the screen based on the range of interest. An example of a method of controlling display brightness will be described. FIG. 5 is a flow chart showing an example of a method of controlling display brightness. The flow chart shown in FIG. 5 is started in accordance with setting the dynamic range assist mode.

First, in S501, the control unit 101 sets a range of interest. Next, in S502, the control unit 101 compares an input level representative of the range of interest set in S501 with thresholds $\alpha$ and $\beta$. The input level representative of the range of interest refers to the input level M in accordance with a user operation. The threshold $\alpha$ is lower than the threshold $\beta$. For example, the threshold $\alpha$ is 60 and the threshold $\beta$ is 195. The processing is advanced to S503 when the input level M is equal to or higher than the threshold $\beta$ but the processing is advanced to S504 when the input level M is lower than the threshold $\alpha$. In addition, the processing is advanced to S505 when the input level M is equal to or higher than the threshold $\alpha$ and lower than the threshold $\beta$.

Moreover, the input level representative of the range of interest may be an input level that differs from the input level M. The thresholds $\alpha$ and $\beta$ may be values (fixed values) set in advance or values that can be changed in accordance with a user operation or the like. The threshold $\alpha$ may be equal to the threshold $\beta$.

In S503, the control unit 101 controls the display brightness of the image displayed on the screen to display brightness that is lower than the set display brightness (emission brightness reduction control). In the present embodiment, in emission brightness reduction control, emission brightness of the backlight unit 108 is reduced so that the display brightness of white is reduced from 400 cd/m$^2$ to 200 cd/m$^2$. For example, the emission brightness of the backlight unit 108 is reduced by reducing a value (a current value, a voltage value, or the like) of a backlight drive signal. When the backlight drive signal is a pulse signal, the emission brightness of the backlight unit 108 is reduced by reducing at least one of a pulse width and a pulse amplitude of the backlight drive signal. Subsequently, the processing is advanced to S505. Moreover, the display brightness after the emission brightness reduction control may be display brightness (fixed brightness) set in advance or display brightness that can be changed in accordance with a user operation or the like. A pulse signal is also referred to as a pulse width modulation (PWM) signal.

In S504, the control unit 101 controls the display brightness of the image displayed on the screen to display brightness that is higher than the set display brightness (emission brightness increase control). In the present embodiment, in emission brightness increase control, emission brightness of the backlight unit 108 is increased so that the display brightness of white is increased from 400 cd/m² to 800 cd/m². For example, the emission brightness of the backlight unit 108 is increased by increasing a value (a current value, a voltage value, or the like) of a backlight drive signal. When the backlight drive signal is a pulse signal, the emission brightness of the backlight unit 108 is increased by increasing at least one of a pulse width and a pulse amplitude of the backlight drive signal. Subsequently, the processing is advanced to S505. Moreover, the display brightness after the emission brightness increase control may be display brightness (fixed brightness) set in advance or display brightness that can be changed in accordance with a user operation or the like.

In S505, the control unit 101 sets conversion characteristics of the gradation conversion process based on the range of interest set in S501 (switching of conversion characteristics).

Figure 6A:
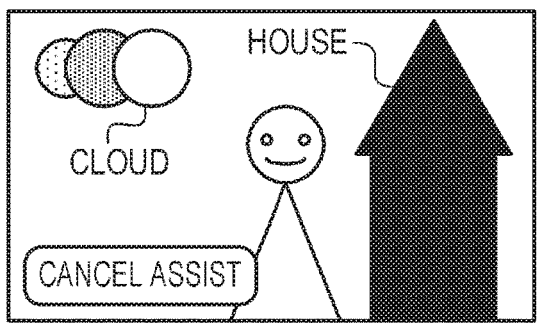
FIGS. 6A and 6B are diagrams showing examples of images according to the first embodiment.

When the range of interest shown in FIG. 4B is set, since the input level M is higher than the threshold β, the processing is advanced from S502 to S503 and emission brightness reduction control is performed. Subsequently, in S505, the conversion characteristics of the gradation conversion process are switched to the conversion characteristics GLUT2 shown in FIG. 4C and the image displayed on the screen is switched. As a result, the user perceives an image shown in FIG. 6A as the image displayed on the screen. Due to the emission brightness reduction control, visibility with respect to low gradation-side gradation properties is increased. Therefore, in the image shown in FIG. 6A, gradation properties of the cloud are higher than the gradation properties of FIG. 3C. In addition, by perceiving the image shown in FIG. 6A, the user can recognize the existence of three clouds. Although the existence of two clouds can be recognized from the image shown in FIG. 3C, the existence of three clouds cannot be recognized from the image shown in FIG. 3C. In this manner, when the range of interest is a high gradation-side gradation range, gradation properties of the range of interest are increased and, at the same time, the display brightness is reduced. As a result, the range of interest can be made visible with sufficiently high gradation properties.

Figure 6B:
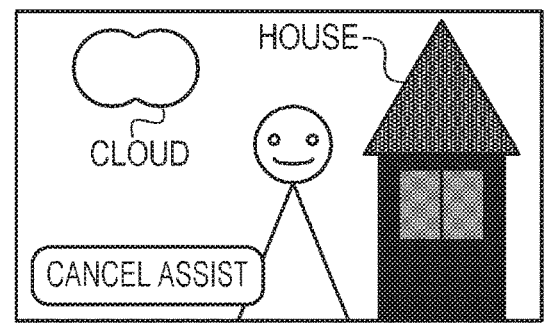

When the range of interest shown in FIG. 4D is set, since the input level M is lower than the threshold α, the processing is advanced from S502 to S504 and emission brightness increase control is performed. Subsequently, in S505, the conversion characteristics of the gradation conversion process are switched to the conversion characteristics GLUT3 shown in FIG. 4E and the image displayed on the screen is switched. As a result, the user perceives an image shown in FIG. 6B as the image displayed on the screen. Due to the emission brightness increase control, visibility with respect to high gradation-side gradation properties is increased. Therefore, in the image shown in FIG. 6B, gradation properties of the house are higher than the gradation properties of FIG. 3E. In addition, by perceiving the image shown in FIG. 6B, the user can recognize the boundary between the roof of the house and the wall of the house. The boundary between the roof of the house and the wall of the house cannot be recognized from the image shown in FIG. 3E. In this manner, when the range of interest is a low gradation-side gradation range, gradation properties of the range of interest are increased and, at the same time, the display brightness is increased. As a result, the range of interest can be made visible with sufficiently high gradation properties.

Moreover, each of the emission brightness reduction control and the emission brightness increase control is not limited to control of the emission brightness of the backlight unit 108. For example, each of the emission brightness reduction control and the emission brightness increase control may be control of image processing (such as the brightness correction process by the brightness/contrast correcting unit 205) with respect to processed image data. Each of the emission brightness reduction control and the emission brightness increase control may be one or both of control of the emission brightness of the backlight unit 108 and control of image processing with respect to processed image data. One of control of the emission brightness of the backlight unit 108 and control of image processing with respect to processed image data may be performed as the emission brightness reduction control and the other may be performed as the emission brightness increase control.

When the input level M is equal to or higher than the threshold α and lower than the threshold β, the range of interest can be made visible with sufficiently high gradation properties without having to perform the emission brightness reduction control and the emission brightness increase control. Therefore, as described earlier, the processing is advanced from S502 to S505 without performing the emission brightness reduction control of S503 and the emission brightness increase control of S504. Subsequently, the control unit 101 controls the display brightness of the image displayed on the screen to the set display brightness. Specifically, the control unit 101 maintains the emission brightness of the backlight unit 108 so that the display brightness of white is maintained at 400 cd/m².

As described above, according to the present embodiment, the emission brightness reduction control is performed when an input level representative of the range of interest is equal to or higher than a first threshold and emission brightness increase control is performed when the input level representative of the range of interest is lower than a second threshold. The second threshold is equal to or lower than the first threshold. Accordingly, the range of interest can be made visible with sufficiently high gradation properties even when the range of interest is a high-gradation side gradation range, when the range of interest is a low-gradation side gradation range, and the like. Moreover, only one of the emission brightness reduction control and the emission brightness increase control may be performed.

Moreover, when realizing the present invention with a self-luminous display apparatus such as an organic EL display apparatus, control of emission brightness of an organic EL light source (light emitting elements) of an organic EL display panel may be performed in place of the control of the emission brightness of the backlight unit 108 described above. For example, control of the emission brightness of the organic EL light source may be performed by changing a driving current value or a driving voltage value of the organic EL light source.

In addition, while a case where the conversion characteristics of the gradation conversion process is switched in S505 from the conversion characteristics GLUT1 to the conversion characteristics GLUT2 or GLUT3 in accordance with the input level M corresponding to a touch position has been described, this operation is not restrictive. For example, the emission reduction process and the emission increase process of S503 and S504 may be performed by always using the conversion characteristics GLUT1 of the gradation conversion process regardless of the input level M corresponding to the touch position. In this case, an image of a range of interest can be confirmed with preferable display brightness while faithfully reproducing gradation characteristics of input image data (captured image data).

Second Embodiment

A second embodiment of the present invention will be described below. An example in which a gradation value of input image data, a gradation value of processed image data, a gradation value of display image data, and the like are 8-bit values has been described in the first embodiment. In the present embodiment, an example in which the number of bits of a gradation value of input image data is larger than the number of bits of a gradation value of processed image data, a gradation value of display image data, and the like will be described. Specifically, it is assumed that the number of bits of a gradation value of input image data is 12 bits. In addition, it is assumed that image data in which the number of bits of a gradation value is 8 bits is generated as a gradation value of processed image data, a gradation value of display image data, and the like. Hereinafter, points (configurations, processes, and the like) that differ from those of the first embodiment will be described in detail and descriptions of points that are the same as those of the first embodiment will be omitted. The number of bits of the gradation value of input image data being larger than the number of bits of the gradation value of display image data can be restated as a dynamic range of brightness (gradation) of the input image data being wider than a dynamic range of brightness (gradation) of the display image data.

The data processing unit 110 according to the present embodiment converts input image data of which the number of bits of a gradation value is 12 bits into compressed image data of which the number of bits of a gradation value is 8 bits. Specifically, the data processing unit 110 converts input image data into compressed image data so that a gradation value of the input image data outside of a range of interest is limited to a gradation value of inside of the range of interest. In addition, the data processing unit 110 outputs the compressed image data (specifically. YCbCr data corresponding to the compressed image data) to the display processing unit 111.

Figure 7A:
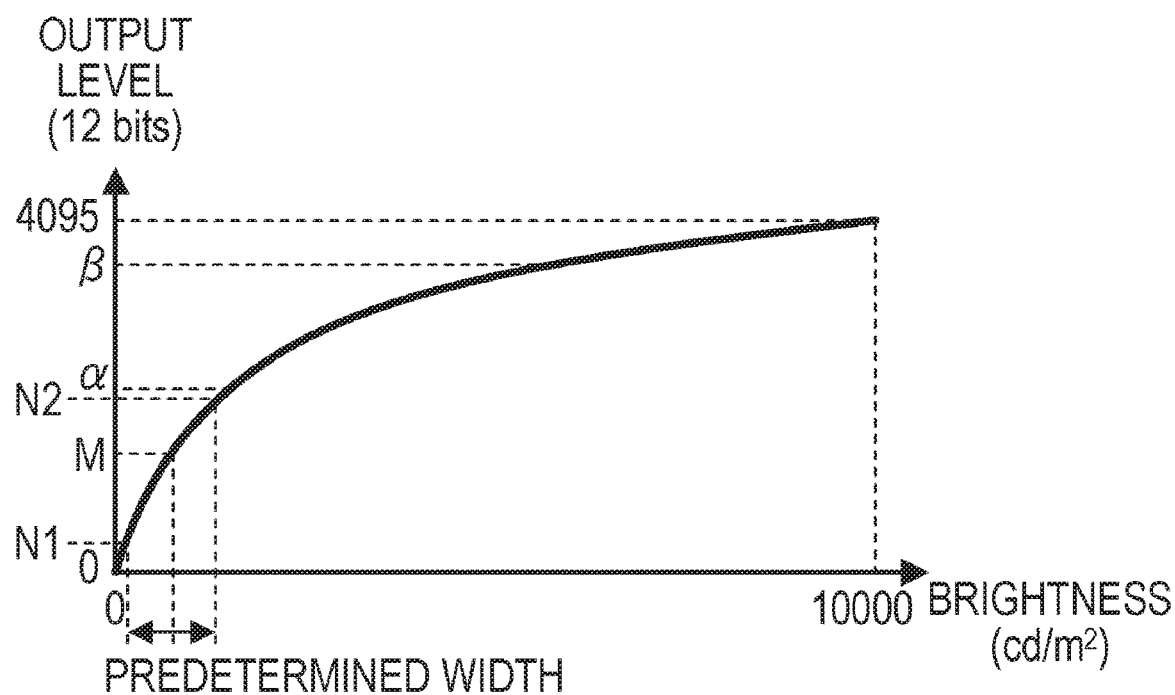
FIGS. 7A and 7B are diagrams showing examples of gradation characteristics and conversion characteristics according to a second embodiment.
Figure 8A:
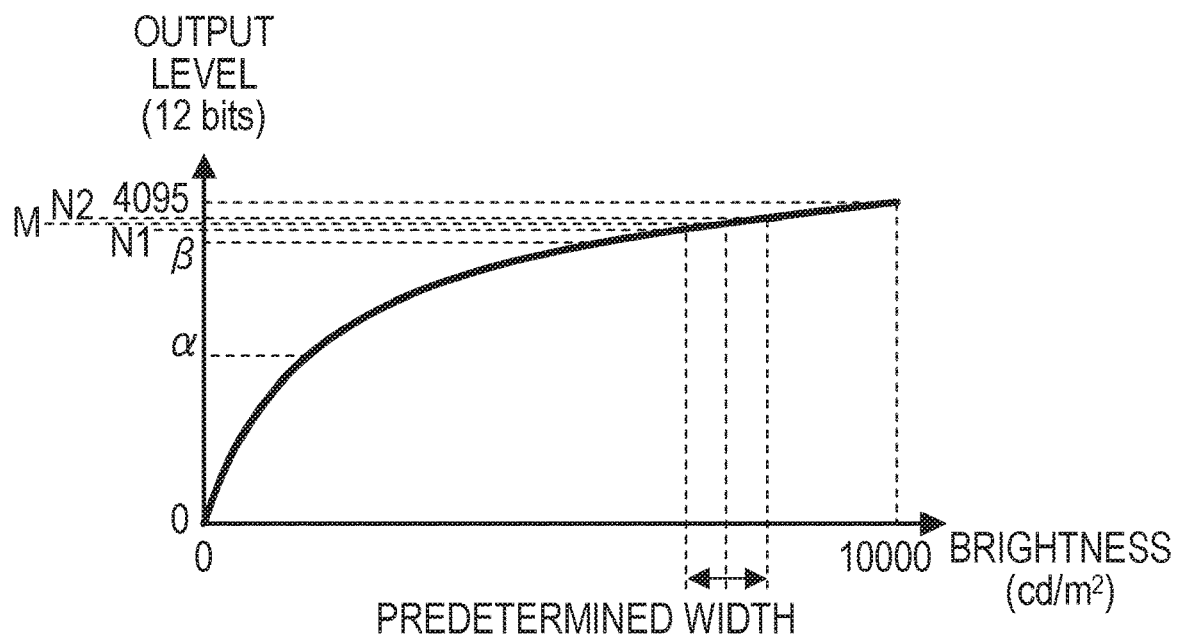
FIGS. 8A and 8B are diagrams showing examples of gradation characteristics and conversion characteristics according to the second embodiment.

FIGS. 7A and 8A show examples of gradation characteristics of input image data. Horizontal axes in FIGS. 7A and 8A represent input brightness (brightness of input image data) and vertical axes in FIGS. 7A and 8A represent a gradation value (an input level) of input image data. Input brightness can also be described as "brightness assumed by input image data", "brightness of the subject", and the like. FIGS. 7A and 8A show an input level M at a center of a range of interest, a minimum value N1 of the input level in the range of interest, and a maximum value N2 of the input level in the range of interest. FIGS. 7A and 8A also show an input brightness range (a range of input brightness) corresponding to the range of interest. In the examples shown in FIGS. 7A and 8A, the range of interest is set so that an input brightness range with a predetermined width corresponds to the range of interest. For example, the range of interest in FIGS. 7A and 8A can be set based on the input level M and gradation characteristics of the input image data. In the data processing unit 110, an input level that is lower than the input level N1 is converted into the input level N1 and an input level that is higher than the input level N2 is converted into the input level N2.

The display processing unit 111 according to the present embodiment converts compressed image data into processed image data and generates display image data. As conversion characteristics of the gradation conversion process, the display processing unit 111 uses conversion characteristics based on gradation characteristics of input image data in the range of interest. Specifically, the display processing unit 111 uses conversion characteristics corresponding to reverse characteristics of characteristics indicating a change in the input level relative to a change in input brightness in the range of interest as the conversion characteristics of the gradation conversion process. Accordingly, input image data is converted into display image data (processed image data) of which gradation properties with respect to the range of interest are higher than the predetermined gradation properties. In the present embodiment, the conversion characteristics of the gradation conversion process are conversion characteristics for converting a gradation value of compressed image data into a gradation value of processed image data.

Figure 7B:
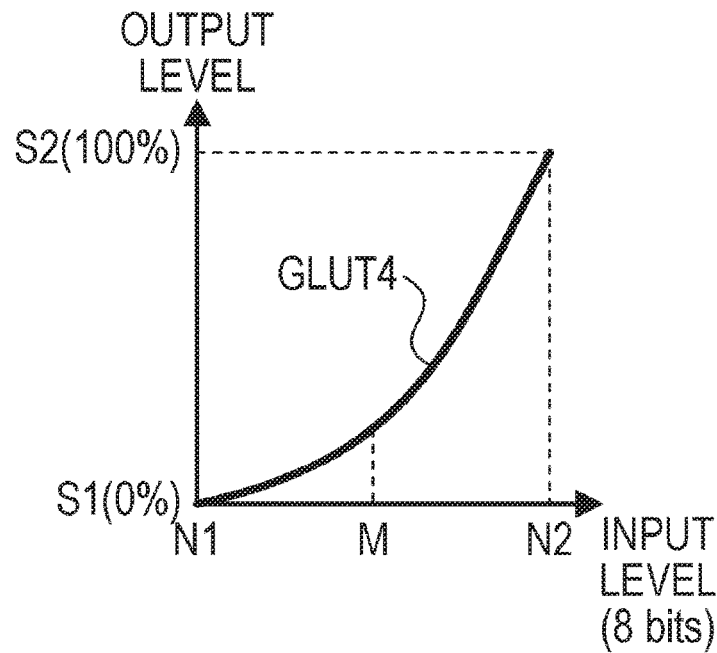
Figure 8B:
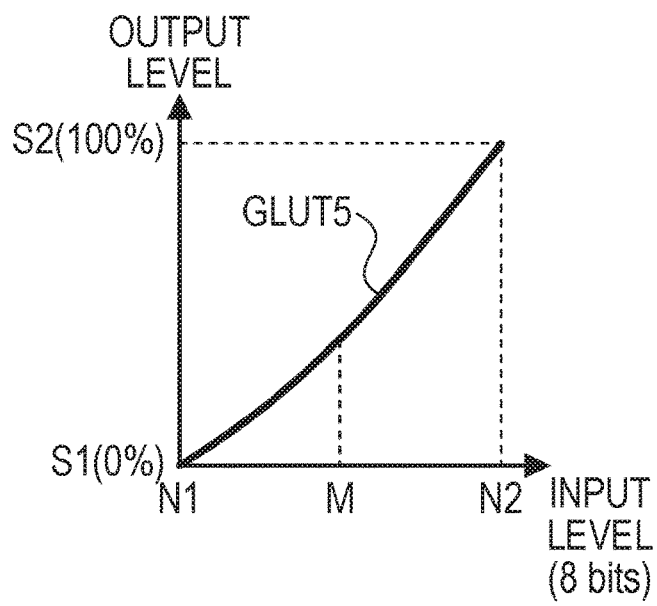

When the range of interest shown in FIG. 7A is set, conversion characteristics GLUT4 shown in FIG. 7B are set. When the range of interest shown in FIG. 8A is set, conversion characteristics GLUT5 shown in FIG. 8B are set. Conversion characteristics GLUT4 and GLUT5 correspond to reverse characteristics of characteristics indicating a change in the input level relative to a change in input brightness in the range of interest. Specifically, horizontal axes (input level) of FIGS. 7B and 8B correspond to the vertical axes (input level) of FIGS. 7A and 8A, and vertical axes (output level) of FIGS. 7B and 8B correspond to the horizontal axes (input brightness) of FIGS. 7A and 8A. On the other hand, as shown in FIGS. 7B and 8B, in the conversion characteristics GLUT4 and GLUT5, an output level of 0% is used as an output level S1 corresponding to the input level N1. In addition, an output level of 100% is used as an output level S2 corresponding to the input level N2.

In the present embodiment, the emission brightness reduction control is similarly performed when the input level M is equal to or higher than the threshold β and the emission brightness increase control is similarly performed when the input level M is lower than the threshold α. When the range of interest shown in FIG. 7A is set, since the input level M is lower than the threshold α, the emission brightness increase control is performed. When the range of interest shown in FIG. 8A is set, since the input level M is higher than the threshold β, the emission brightness reduction control is performed.

As described above, in the present embodiment, the emission brightness reduction control and the emission brightness increase control are executed as necessary in a similar manner to the first embodiment. Accordingly, the range of interest can be made visible with sufficiently high gradation properties.

Figure 11:
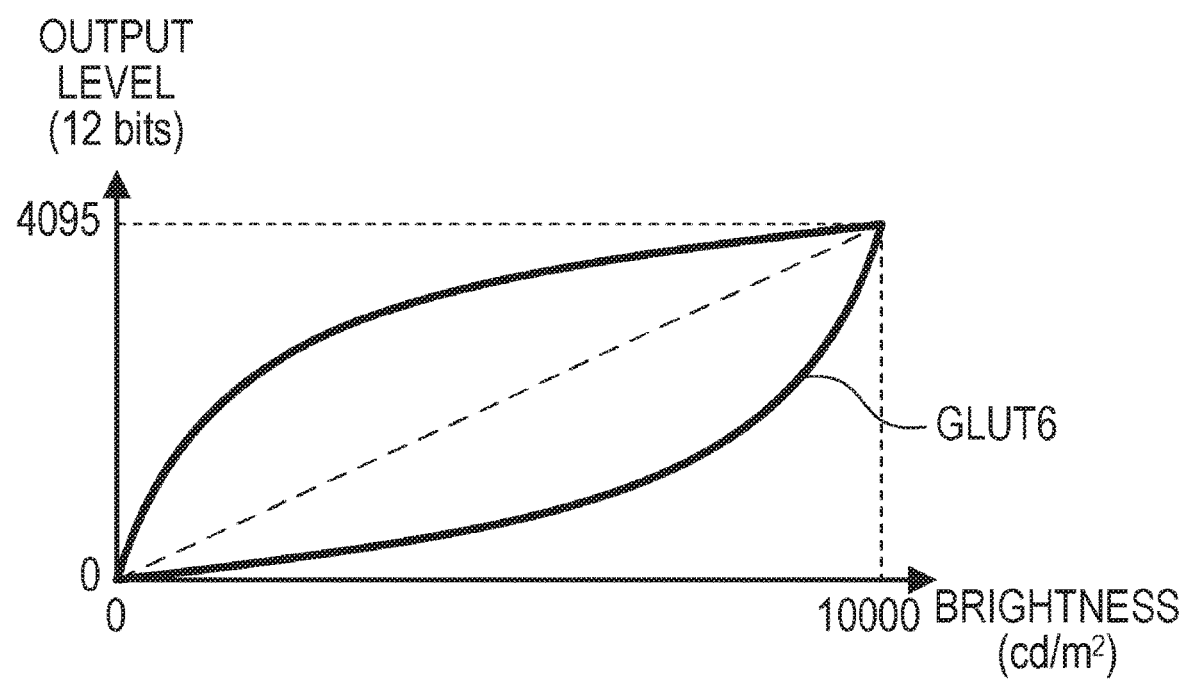
FIG. 11 is another diagram showing examples of gradation characteristics and conversion characteristics according to the second embodiment.

Moreover, in place of the conversion characteristics shown in FIGS. 7B and 8B, the gradation conversion process may be performed using conversion characteristics GLUT6 as shown in FIG. 11. Although reverse characteristics of a partial range of interest in an entire range of the gradation characteristics of input image data is used when using the conversion characteristics shown in FIGS. 7B and 8B, reverse characteristics of the entire range of the gradation characteristics of input image data is used when using the conversion characteristics GLUT6 shown in FIG. 11.

Third Embodiment

A third embodiment of the present invention will be described below. In the present embodiment, an example will be described in which external light (ambient light;

natural light, illuminating light, and the like) with respect to the display apparatus is further taken into consideration. Hereinafter, points (configurations, processes, and the like) that differ from those of the first embodiment will be described in detail and descriptions of points that are the same as those of the first embodiment will be omitted.

Figure 9:
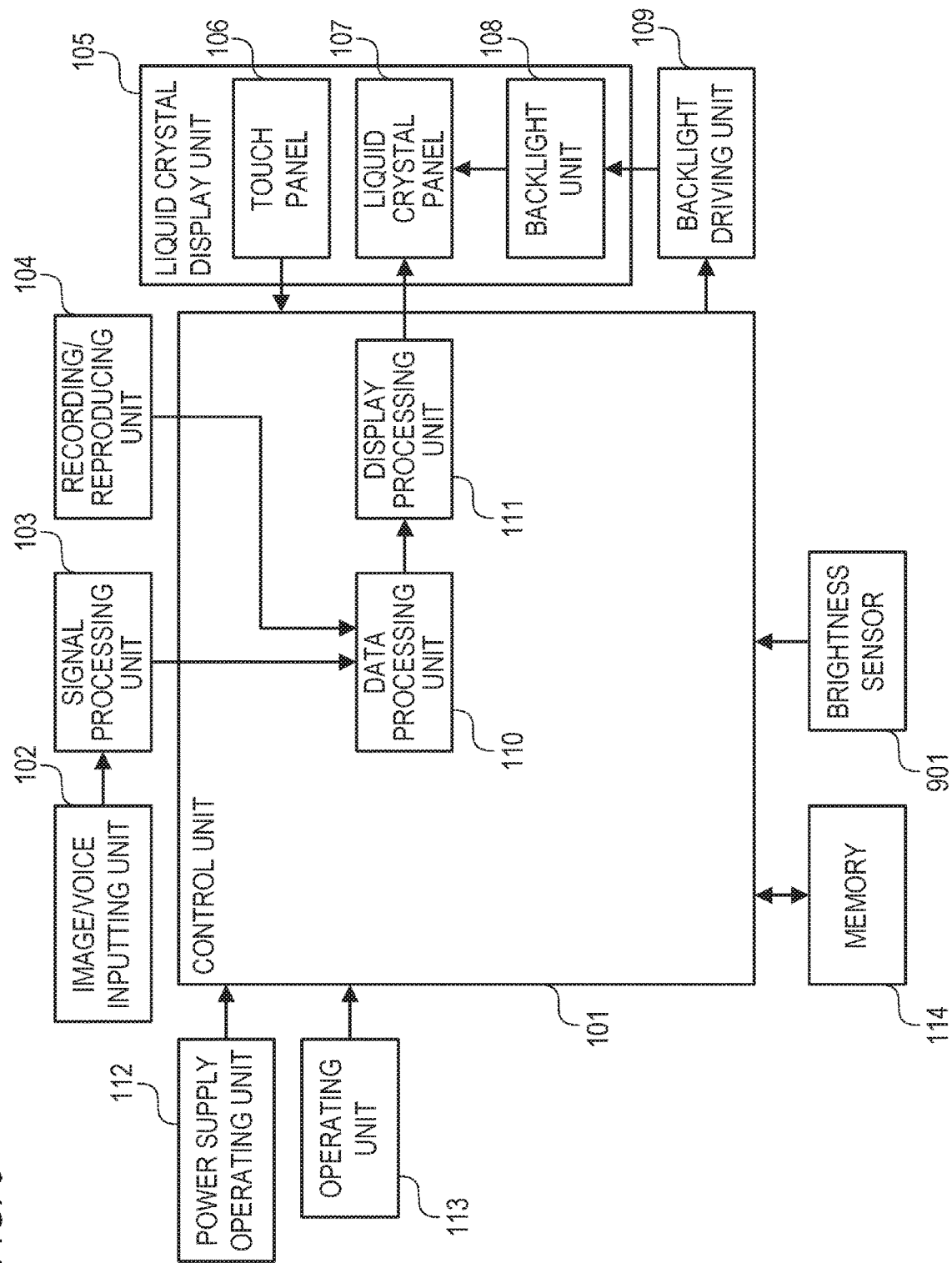
FIG. 9 is a block diagram showing a configuration example of an imaging apparatus according to a third embodiment.

FIG. 9 is a block diagram showing a configuration example of an imaging apparatus according to the present embodiment. The imaging apparatus according to the present embodiment includes a plurality of the functional units of the first embodiment (FIG. 1) and a brightness sensor 901. The brightness sensor 901 detects brightness of external light with respect to the imaging apparatus and outputs a detected value to the control unit 101.

Figure 10:
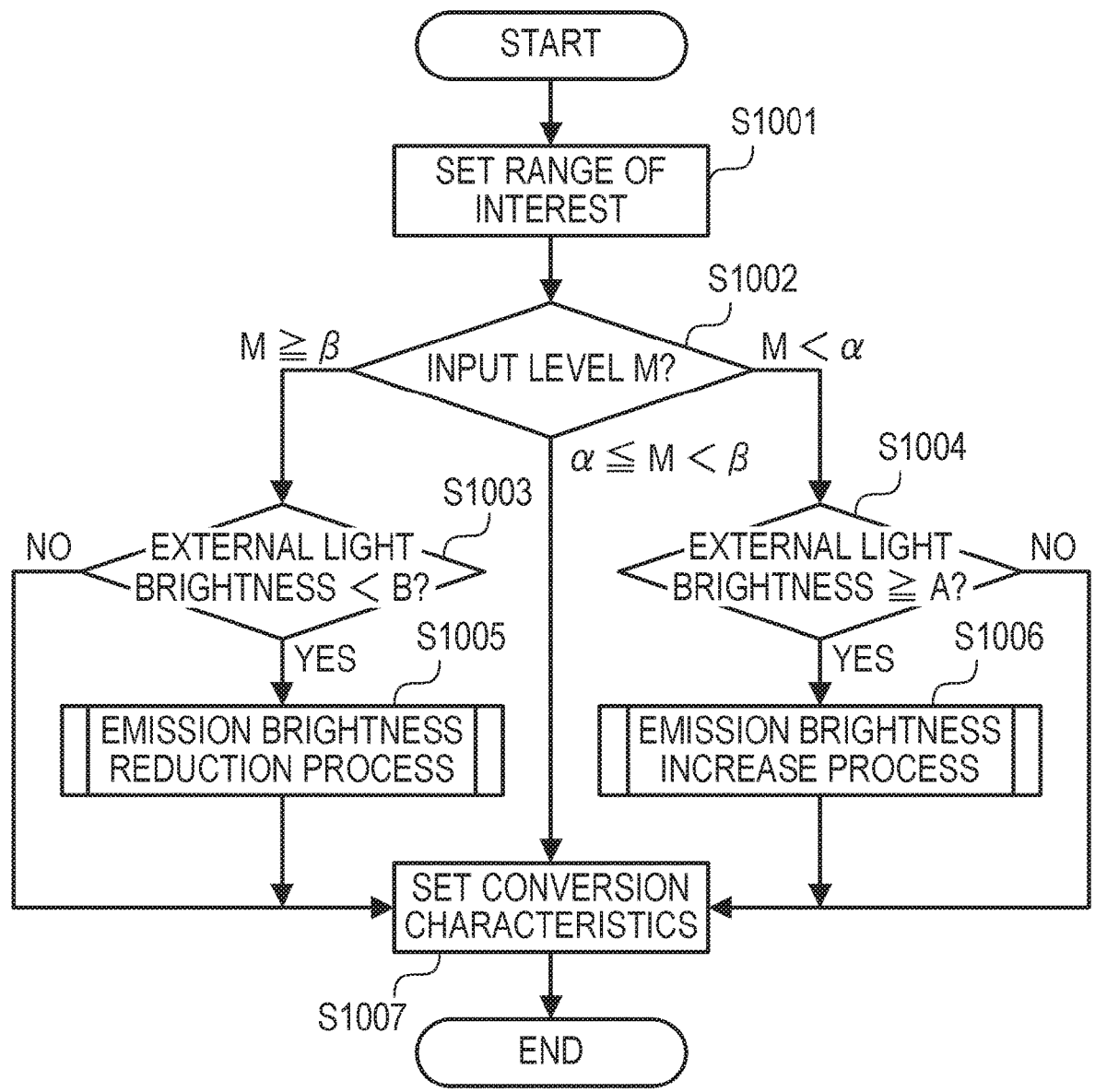
FIG. 10 is a flow chart showing an example of a processing flow according to the third embodiment.

In the present embodiment, a method of controlling display brightness differs from that of the first embodiment. FIG. 10 is a flow chart showing an example of a method of controlling display brightness according to the present embodiment. First, processing of S1001 and S1002 is performed. The processing of S1001 and S1002 is the same as the processing of S501 and S502 in the first embodiment (FIG. 5). The processing is advanced to S1003 when the input level M is equal to or higher than the threshold β but the processing is advanced to S1004 when the input level M is lower than the threshold α. In addition, the processing is advanced to S1007 when the input level M is equal to or higher than the threshold α and lower than the threshold β. The processing of S1007 is the same as the processing of S505 in the first embodiment.

In S1003, the control unit 101 determines whether or not the detected value (detected brightness) of the brightness sensor 901 is lower than a threshold B. When the detected value is lower than the threshold B, processing of S1005 is performed and processing is advanced to S1007. The processing of S1005 is the same as the processing of S503 (emission brightness reduction control) in the first embodiment. When the detected value is equal to or higher than the threshold B, processing is advanced to S1007 without performing the emission brightness reduction control of S1005. The threshold B is a value for determining whether or not a use environment of the imaging apparatus is a bright environment such as outdoors and is, for example, 10,000 lux. Moreover, the threshold B may be a value (a fixed value) set in advance or a value that can be changed in accordance with a user operation or the like.

When emission brightness reduction control is performed in a case where the detected value is equal to or higher than the threshold B or, in other words, in a case where the use environment of the imaging apparatus is a bright environment, visibility (viewability) of an image displayed on the screen declines. Specifically, since the image displayed on the screen is too dark, the user cannot even recognize an angle of view (an imaging range), a composition, and the like even when viewing the image displayed on the screen. In consideration thereof, in the present embodiment, the emission brightness reduction control is omitted in such cases. Accordingly, a decline in visibility (a decline in visibility of an image displayed on the screen) due to the emission brightness reduction control can be suppressed.

In S1004, the control unit 101 determines whether or not the detected value of the brightness sensor 901 is equal to or higher than a threshold A. When the detected value is equal to or higher than the threshold A, processing of S1006 is performed and processing is advanced to S1007. The processing of S1006 is the same as the processing of S504 (emission brightness increase control) in the first embodiment. When the detected value is lower than the threshold A, processing is advanced to S1007 without performing the emission brightness increase control of S1006. The threshold A is a value for determining whether or not a use environment of the imaging apparatus is a dark environment such as nighttime and is, for example, 100 lux. Moreover, the threshold A may be a value (a fixed value) set in advance or a value that can be changed in accordance with a user operation or the like. The threshold A may be equal to the threshold B.

When emission brightness increase control is performed in a case where the detected value is lower than the threshold A or, in other words, in a case where the use environment of the imaging apparatus is a dark environment, visibility (viewability) of an image displayed on the screen declines. Specifically, since the image displayed on the screen is too bright, the user is blinded and cannot view the image displayed on the screen with high visibility. In consideration thereof, in the present embodiment, the emission brightness increase control is omitted in such cases. Accordingly, a decline in visibility due to the emission brightness increase control can be suppressed. In addition, when the use environment of the imaging apparatus is a dark environment, visibility with respect to low gradation-side gradation properties is high. Therefore, a low gradation-side range of interest can be made visible with sufficiently high gradation properties even when the emission brightness increase control is omitted.

As described above, according to the present embodiment, the emission brightness reduction control and the emission brightness increase control are executed as necessary in a similar manner to the first embodiment. Accordingly, the range of interest can be made visible with sufficiently high gradation properties in various situations. In addition, since the emission brightness reduction control and the emission brightness increase control are appropriately omitted in accordance with brightness of external light, a decline in visibility due to the emission brightness reduction control and the emission brightness increase control can be suppressed.

Each functional unit according to the first to third embodiments may or may not be individual hardware. Functions of two or more functional units may be realized by common hardware. Each of a plurality of functions of a single functional unit may be realized by individual hardware. Two or more functions of a single functional unit may be realized by common hardware. In addition, each functional unit may or may not be realized by hardware. For example, an apparatus may include a processor and a memory storing a control program. Furthermore, functions of at least a part of the functional units included in the apparatus may be realized by having the processor read the control program from the memory and execute the control program.

It is to be understood that the first to third embodiments are merely examples and that configurations obtained by appropriately modifying or altering the configurations of the first to third embodiments without departing from the spirit and scope of the present invention are also included in the present invention. Configurations obtained by appropriately combining the configurations of the first to third embodiments are also included in the present invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-099671, filed on May 19, 2017, and Japanese Patent Application No. 2018-029449, filed on Feb. 22, 2018, which are hereby incorporated by reference herein in their entirety.

What is claimed is:

1. A display apparatus, comprising:
a backlight having a light source;
a display panel configured to display an image by transmitting, based on display image data generated from input image data, light emitted from the backlight; and
at least one memory and at least one processor which function as:
a control unit configured to control emission brightness of the light source; and
a detecting unit configured to detect a user operation for specifying a position in the image, wherein
the control unit
determines, in accordance with a gradation value of the input image data corresponding to the position specified by the user operation, whether to control the emission brightness of the light source to emission brightness lower than set emission brightness or to control the emission brightness of the light source to emission brightness higher than the set emission brightness, and
controls the emission brightness of the light source in accordance with a result of the determination,
the control unit
compares the gradation value of the input image data corresponding to the position specified by the user operation with each of a first threshold and a second threshold lower than the first threshold, and
performs, on a basis of a result of the comparison, at least one of:
a first control in which, in a case where the gradation value of the input image data corresponding to the position specified by the user operation is equal to or higher than the first threshold, the emission brightness of the light source is controlled to emission brightness that is lower than the set emission brightness;
a second control in which, in a case where the gradation value of the input image data corresponding to the position specified by the user operation is lower than the second threshold, the emission brightness of the light source is controlled to emission brightness that is higher than the set emission brightness; and
a third control in which in a case where the gradation value of the input image data corresponding to the position specified by the user operation is equal to or higher than the second threshold and lower than the first threshold, the emission brightness of the light source is controlled to the set emission brightness.

2. The display apparatus according to claim 1, wherein the set emission brightness is fixed brightness determined in advance.

3. The display apparatus according to claim 1, wherein the gradation value corresponding to the specified position in the image is a gradation value representative of a gradation range of interest, including a gradation value of the input image data at the specified position in the image.

4. The display apparatus according to claim 3, wherein the gradation value representative of the gradation range of interest is a gradation value at a center of the gradation range of interest.

5. The display apparatus according to claim 1, wherein the at least one memory and at least one processor further function as
a converting unit configured to generate the display image data by performing a gradation conversion process on the input image data, wherein
the gradation conversion process is a process of increasing gradation properties in the gradation range of interest, including the gradation value corresponding to the specified position in the image.

6. The display apparatus according to claim 5, wherein the gradation conversion process is a process of increasing gradation properties in the gradation range of interest so that a ratio of a gradation range corresponding to the gradation range of interest to an entire gradation range of the display image data equals a predetermined value.

7. The display apparatus according to claim 5, wherein the gradation conversion process is a process of limiting a gradation value outside of the gradation range of interest in the input image data to a gradation value inside of the gradation range of interest and using conversion characteristics based on gradation characteristics of the input image data in the gradation range of interest.

8. The display apparatus according to claim 7, wherein the conversion characteristics correspond to reverse characteristics of characteristics indicating a change in a gradation value of the input image data relative to a change in brightness of the input image data in the gradation range of interest.

9. The display apparatus according to claim 5, wherein a number of bits of the input image data is larger than the number of bits of the display image data.

10. The display apparatus according to claim 1, further comprising
a brightness sensor configured to detect brightness of external light, wherein
in a case where the brightness detected by the brightness sensor is equal to or higher than a third threshold, even if the gradation value corresponding to the specified position in the image is equal to or higher than the first threshold, the control unit does not perform the first control.

11. The display apparatus according to claim 1, further comprising
a brightness sensor configured to detect brightness of external light, wherein
in a case where the brightness detected by the brightness sensor is lower than a fourth threshold, even if the gradation value corresponding to the specified position in the image is lower than the second threshold, the control unit does not perform the second control.

12. The display apparatus according to claim 1, wherein
the control unit uniquely determines, in accordance with the gradation value of the input image data corresponding to the position specified by the user operation, whether to control the emission brightness of the light source to emission brightness lower than the set emission brightness or to control the emission brightness of the light source to emission brightness higher than the set emission brightness.

13. The display apparatus according to claim 1, wherein
each of the first control and the second control is control for increasing visibility with respect to gradation properties in a gradation range of interest, including the gradation value corresponding to the specified position in the image.

14. The display apparatus according to claim 1, wherein
the control unit performs both of the first control and the second control.

15. A display method for a display apparatus including a backlight having a light source, and a display panel configured to display an image by transmitting, based on display image data generated from input image data, light emitted from the backlight, the display method comprising:

a control step of controlling emission brightness of the light source; and
a detecting step of detecting a user operation for specifying a position in the image, wherein
the control step includes:
a step of determining, in accordance with a gradation value of the input image data corresponding to the position specified by the user operation, whether to control the emission brightness of the light source to emission brightness lower than set emission brightness or to control the emission brightness of the light source to emission brightness higher than the set emission brightness; and
a step of controlling the emission brightness of the light source in accordance with a result of the determination,
in the control step,
the gradation value of the input image data corresponding to the position specified by the user operation is compared with each of a first threshold and a second threshold lower than the first threshold, and
at least one of:
a first control in which, in a case where the gradation value of the input image data corresponding to the position specified by the user operation is equal to or higher than the first threshold, the emission brightness of the light source is controlled to emission brightness that is lower than the set emission brightness;
a second control in which, in a case where the gradation value of the input image data corresponding to the position specified by the user operation is lower than the second threshold, the emission brightness of the light source is controlled to emission brightness that is higher than the set emission brightness; and
a third control in which in a case where the gradation value of the input image data corresponding to the position specified by the user operation is equal to or higher than the second threshold and lower than the first threshold, the emission brightness of the light source is controlled to the set emission brightness is performed.

* * * * *